US008868680B2

(12) United States Patent
Gupta et al.

(10) Patent No.: US 8,868,680 B2
(45) Date of Patent: Oct. 21, 2014

(54) METHODS FOR RECOMMENDING PERSONALIZED CONTENT BASED ON PROFILE AND CONTEXT INFORMATION AND DEVICES THEREOF

(75) Inventors: Puneet Gupta, Bangalore (IN); Venkat Kumar Sivaramamurthy, Bangalore (IN); Akshay Darbari, Allahabad (IN); Karthik Gopalakrishnan Vinmani, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 86 days.

(21) Appl. No.: 13/217,334

(22) Filed: Aug. 25, 2011

(65) Prior Publication Data
US 2013/0007198 A1 Jan. 3, 2013

(30) Foreign Application Priority Data

Jun. 30, 2011 (IN) .......................... 2220/CHE/2011

(51) Int. Cl.
| | |
|---|---|
| G06F 15/16 | (2006.01) |
| H04N 21/2668 | (2011.01) |
| G06Q 30/02 | (2012.01) |
| H04N 21/258 | (2011.01) |
| H04N 21/81 | (2011.01) |

(52) U.S. Cl.
CPC ....... *G06Q 30/0271* (2013.01); *H04N 21/2668* (2013.01); *H04N 21/25808* (2013.01); *H04N 21/812* (2013.01); *H04N 21/25866* (2013.01); *G06Q 30/0282* (2013.01)
USPC ........................... 709/217; 709/223; 709/203

(58) Field of Classification Search
CPC .......... G06Q 30/0271; G06Q 30/0282; H04N 21/812; H04N 21/2668; H04N 21/25866
USPC .................. 709/217–219, 223–224, 246, 203
See application file for complete search history.

(56) References Cited

U.S. PATENT DOCUMENTS

| | | | |
|---|---|---|---|
| 7,072,932 B1 * | 7/2006 | Stahl .............................. 709/203 |
| 2008/0139112 A1 * | 6/2008 | Sampath et al. ............. 455/3.04 |
| 2008/0189360 A1 * | 8/2008 | Kiley et al. ................... 709/203 |
| 2010/0125544 A1 * | 5/2010 | Lee et al. ......................... 706/54 |
| 2010/0251280 A1 * | 9/2010 | Sofos et al. ...................... 725/14 |
| 2010/0269058 A1 * | 10/2010 | Othmer et al. ................. 709/224 |
| 2011/0113471 A1 * | 5/2011 | Hjelm et al. ....................... 726/1 |
| 2012/0124456 A1 * | 5/2012 | Perez et al. .................... 715/200 |
| 2012/0209839 A1 * | 8/2012 | Andrews et al. .............. 707/728 |

* cited by examiner

*Primary Examiner* — Philip B Tran
(74) *Attorney, Agent, or Firm* — LeClairRyan, a Professional Corporation

(57) ABSTRACT

A method, non-transitory computer readable medium, and apparatus that identifies profile information for a received request associated with an end user at a requesting computing device and context information associated with the requesting computing device. Customized content responsive to the received request is obtained from a content provider device based on the identified profile information and the identified context information. The obtained customized content is providing to the requesting computing device.

33 Claims, 2 Drawing Sheets

METHODS FOR RECOMMENDING PERSONALIZED CONTENT BASED ON PROFILE AND CONTEXT INFORMATION AND DEVICES THEREOF

This application claims the benefit of Indian Patent Application Filing No. 2220/CHE/2011, filed Jun. 30, 2011, which is hereby incorporated by reference in its entirety.

FIELD

This technology generally relates to methods and devices for providing content and, more particularly, to methods for recommending personalized content based on profile and context information and devices thereof.

BACKGROUND

When requests are received by content provider systems from a variety of different types of devices, such as mobile phones, smart phones, PDAs, laptop computing systems, and desktop computing systems, the content provider systems select and provide responsive stored content. A variety of different types of stored content could be selected and provided, such as documents, spreadsheets, videos, pictures, music, and web pages by way of example.

Unfortunately, the selection and delivery of responsive stored content by content provider systems may not always result in the best suited content being delivered for either the user or the requesting device. For example, other stored content which might have been more suitable for the user at the requesting device will not be recognized by content provider systems. Additionally, other related stored content which was not directly requested, but might be desirable to provide to the user will not be identified and provided by content provider systems. Further, content provider systems may not select and provide stored content in the most appropriate format for different constraints relating to the requesting device, such as screen size, available bandwidth, storage capacity, and processing capability.

SUMMARY

A method for recommending personalized content includes identifying with a content management computing apparatus profile information for a received request associated with an end user at a requesting computing device and context information associated with the requesting computing device. Customized content responsive to the received request is obtained by the content management computing apparatus from a content provider device based on the identified profile information and the identified context information. The obtained customized content is providing by the content management computing apparatus to the requesting computing device.

A non-transitory computer readable medium having stored thereon instructions for recommending personalized content comprising machine executable code which when executed by at least one processor, causes the processor to perform steps including identifying profile information for a received request associated with an end user at a requesting computing device and context information associated with the requesting computing device. Customized content responsive to the received request is obtained from a content provider device based on the identified profile information and the identified context information. The obtained customized content is providing to the requesting computing device.

A secure authentication computing apparatus includes one or more processors and a memory coupled to the one or more processors which are configured to execute programmed instructions stored in the memory including identifying profile information for a received request associated with an end user at a requesting computing device and context information associated with the requesting computing device. Customized content responsive to the received request is obtained from a content provider device based on the identified profile information and the identified context information. The obtained customized content is providing to the requesting computing device.

This technology provides a number of advantages including providing more effective methods and devices to recommend personalized content based on profile and context information. This technology is able to identify and provide the more suitable stored content in response to received requests. Additionally, this technology facilitates identifying related stored content which may not have been directly requested, but would be desirable to provide to the user with the requested stored content. Further, this technology selects and provides stored content in a more appropriate format for different constraints relating to the requesting device, such as screen size, available bandwidth, storage capacity, and processing capability.

DETAILED DESCRIPTION

Figure 1:
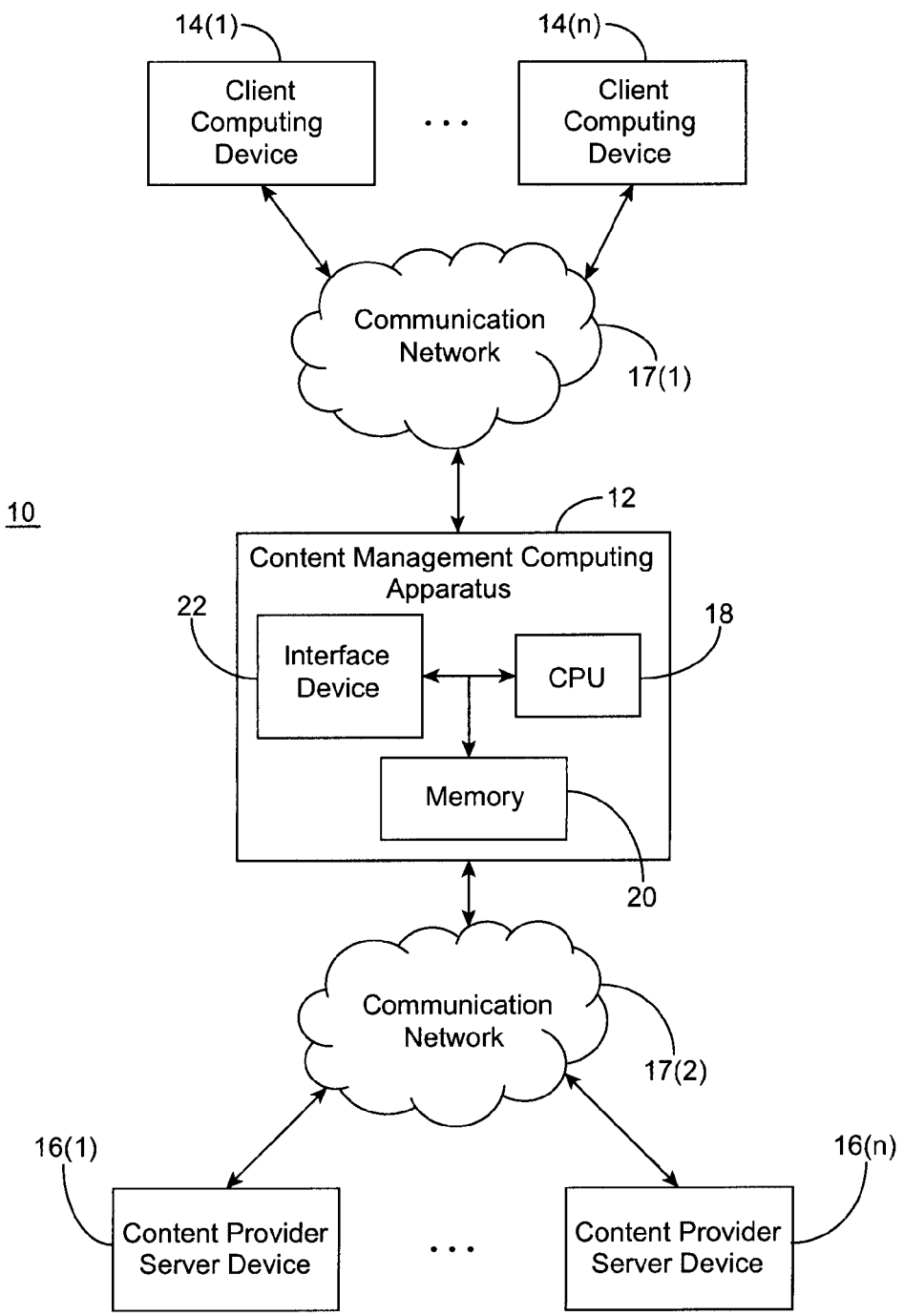
FIG. 1 is an environment with an exemplary content management computing apparatus.

An environment 10 with an exemplary content management computing apparatus 12 is illustrated in FIG. 1. The environment 10 includes the content management computing apparatus 12, client computing devices 14(1)-14(n), and content provider server devices 16(1)-16(n), which are all coupled together by one or more communication networks 17(1)-17(2), although this environment can include other numbers and types of systems, devices, components, and elements in other configurations, such as multiple numbers of each of these apparatuses and devices. This technology provides a number of advantages including providing more effective methods and devices to recommend personalized content based on profile and context information.

The content management computing apparatus 12 includes a central processing unit (CPU) or processor 18, a memory 20, and an interface device 22 which are coupled together by a bus or other link, although other numbers and types of systems, devices, components, and elements in other configurations and locations can be used. The processor 18 in the content management computing apparatus 12 executes a program of stored instructions for one or more aspects of the present technology as described and illustrated by way of the examples herein, although other types and numbers of processing devices and logic could be used and the processor could execute other numbers and types of programmed instructions.

The memory 20 in the content management computing apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The interface device 22 in the content management computing apparatus 12 is used to operatively couple and communicate between the content management computing apparatus 12 and the content provider server devices 16(1)-16(n) and the client computing devices 14(1)-14(n) via one or more of the communications networks 17(1)-17(2), although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

The client computing devices 14(1)-14(n) and the content provider server devices 16(1)-16(n) each include a central processing unit (CPU) or processor, a memory, and an interface or I/O system, which are coupled together by a bus or other link, although each could comprise other numbers and types of devices, elements, and components in other configurations. Additionally, other types of servers, computing devices or other apparatuses could be used for one or more of the client computing devices 14(1)-14(n) and for one or more of the content provider server devices 16(1)-16(n).

Although examples of the content management computing apparatus 12, the client computing devices 14(1)-14(n), and the content provider server devices 16(1)-16(n) coupled together vi the communication networks 17(1)-17(2) are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
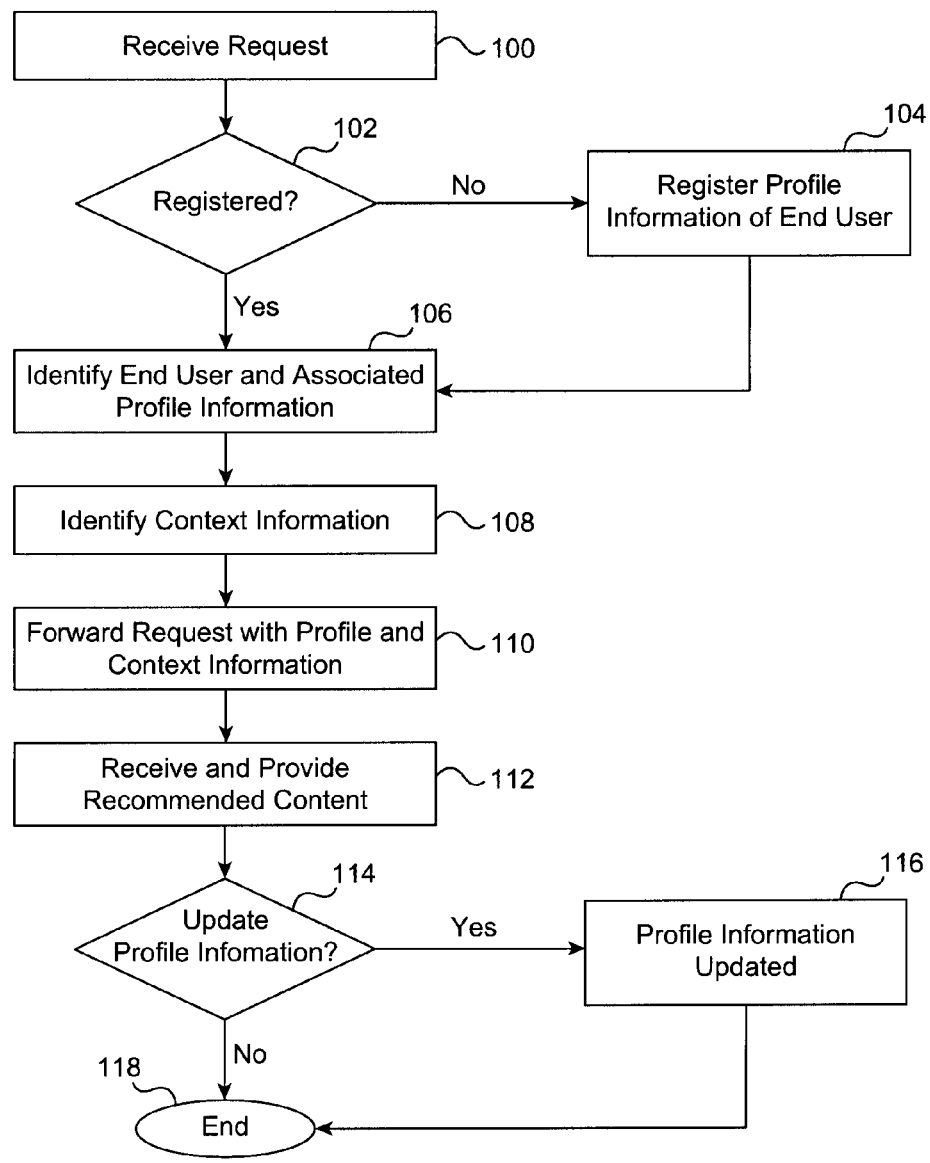
FIG. 2 is a flow chart of an exemplary method for recommending personalized content based on profile and context information.

An exemplary method for recommending personalized content based on profile and context information will now be described with reference to FIGS. 1-2. In step 100, an end user at one of the client computing devices 14(1)-14(n) makes a request for content stored from one of the content provider server devices 16(1)-16(n) through a channel, such as SMS, IVR, Internet, and social networking sites by way of example only. This request from the requesting one of the client computing devices 14(1)-14(n) is received by the content management computing apparatus 12, although other manners for obtaining the request could be used.

In step 102, the content management computing apparatus 12 determines whether the end user at the one of the client computing devices 14(1)-14(n) that makes a request is registered. If in step 102, the content management apparatus 12 determines the end user at the one of the client computing devices 14(1)-14(n) that makes the request is not registered, then the No branch is taken to step 104. In step 104, the content management computing apparatus 12 interacts with the one of the client computing devices 14(1)-14(n) that makes the request to register the end user to obtain profile information, although other manners for obtaining this profile information can be used, such as searching and retrieving this data from other sources. If in step 102, the content management apparatus 12 determines the end user at the one of the client computing devices 14(1)-14(n) that makes the request is already registered, then the Yes branch is taken to step 106.

In step 106, the content management computing apparatus 12 identifies and obtains the profile information of the end user at the one of the client computing devices 14(1)-14(n) that submitted the request. The profile information relates to personal information and usage information for the end user at the one of the client computing devices 14(1)-14(n), although other types of personal data can comprise the profile information and be utilized by this technology. In this example, the profile information comprises personal information about the end user and also usage pattern information by the end user, although other types and amounts of data can be stored as profile information. More specifically, the personal information may include one or more of age, residential address, business address, home phone number, business phone number, cell phone number, email address, occupation, primary language, religion, marital status, family status, and ethnicity of the end user by way of example only, although other types and amounts of personal information can be gathered and stored. Additionally, the usage pattern information includes data on the types and frequency of different types of requests by the end user via one of the client computing devices 14(1)-14(n), which also is stored as profile information associated with the end user, although other types and amounts of usage information can be gathered and stored. By way of example only, the usage pattern information could comprise the types and numbers of news, sports, and entertainment requests made by the end user. The profile information obtained by the content management apparatus 12 for the end user at one of the client computing devices 14(1)-14(n) is only valid for the session associated with the current request and is never shared providing privacy to the end user.

In step 108, the content management apparatus 12 identifies and obtains context information for the one of the client computing devices 14(1)-14(n) associated with the received request. In this example, the content management apparatus 12 identifies the type of apparatus the requesting one of the client computing devices 14(1)-14(n) is from the request, such as the type of mobile device, laptop computing device or desktop computing device by way of example only. Next, the content management apparatus 12 obtains the context information about the identified type of apparatus from a stored database of context information for different types of apparatuses from memory, although this context information could be obtained from other sources and in other manners, such as by researching the identified type of apparatus at other sources to obtain the context information. The content management apparatus 12 also may evaluate the current operational status of the requesting one of the client computing devices 14(1)-14(n), such as the type of connection being used, the current available bandwidth and the number of other applications currently executing on the requesting one of the client computing devices 14(1)-14(n) by way of example only, to obtain additional context information. The context information relates to the requesting one of the client computing devices 14(1)-14(n) and its relationship to the network environment, although other types of information related to the requesting one of the client computing devices 14(1)-14(n) could be used. By way of example only, the identified and obtained context information may include one or more of screen size, available bandwidth, storage capacity, processing capability, location, number and type of applications currently executing, current network subscription, such as a 2 G, 3 G, or 4 G subscription, and current network load for the requesting one of the client computing devices 14(1)-14(n), although other types and amounts of context information can be obtained and used. As explained in greater detail below, based on the particular context information for the requesting one of the client computing devices 14(1)-14(n), the content management apparatus 12 can modify, adjust, and/or add to the requested content to generate customized content, such as customized content: for the particular screen size at the requesting computing device; to adjust for available bandwidth to download the customized content to the requesting computing device; to adjust for available storage at the requesting computing device for receiving customized content; for processing capability currently available at the requesting computing device; for the location of the requesting computing device which could impact communications; for a number and type of applications currently executing on the requesting computing device; based on the current network subscription, such as a 2 G, 3 G, or 4 G subscription, of the requesting computing device; and based on current network load on the connections between the requesting computing device and the content provider device by way of example only.

The content management apparatus 12 also may have obtained and stored one or more criteria for identifying a match with profile information associated with a request from one or more of the content provider server devices 16(1)-16(n), although other manners for obtaining criteria for identifying a match can be used. Based on a received request for one of the content provider server devices 16(1)-16(n), the content management apparatus 12 may evaluate and determine if there is a match with one or more stored criteria associated with the one of the content provider server devices 16(1)-16(n) that the request is directed to. When the content management apparatus 12 detects a match, the content management apparatus 12 may provide a content recommendation for additional content which may or may not be directly responsive to the request to be provided with the response. By way of example only, if the received request is for specific travel content and the profile information associated with the request indicates a match between a criteria for a specific airline and a frequent flyer membership stored in the identified profile information, then the content management apparatus 12 may generate and provide a content recommendation for additional content, such as an advertisement for that specific airline, to the one of the content provider server devices 16(1)-16(n) that the request is directed to.

In step 110, the content management computing apparatus 12 forwards the request along with the identified profile information and the context information to the one of the content provider server devices 16(1)-16(n) to which the request was initially directed. The content management computing apparatus 12 also may optionally forward the content recommendation if there is a match as described above to the one of the content provider server devices 16(1)-16(n) to which the request was initially directed or in other examples to another device or apparatus which could obtain and provide the additional content.

Next, the one of the content provider server devices 16(1)-16(n) to which the request was initially directed receives and evaluates the request from the content management computing apparatus 12 along with the profile information and context information to obtain customized content which is more responsive to the received request based on the identified profile information and context information, although other types and amounts of information can be provided with the request. For example, the one of the content provider server devices 16(1)-16(n) may receive a request for a particular video and based on the request along with the profile information and context information may obtain a format of the video which is in the native language of the end user and has larger font text in the video because of vision problem identified in profile information and also which is designed to display properly based on the screen size, media player, current network subscription, and current available bandwidth at the requesting one of the client computing devices 14(1)-14(n) identified in the context information. In another example, if the identified context information indicates the network is heavily loaded, then the one of the content provider server devices 16(1)-16(n) might adjust the response to the request for a video advertisement to just a picture advertisement. The one of the content provider server devices 16(1)-16(n) also may optionally receive and evaluate the content recommendation to obtain additional content which is associated with the received request, such as an advertisement. Next, the one of the content provider server devices 16(1)-16(n) provides the customized content based on the request along with the profile information and context information and optionally any additional content based on the content recommendation to the content management computing apparatus 12, although other manners for obtaining and providing the customized content and optional additional content could be used.

In step 112, the content management computing apparatus 12 receives the customized content based on the request along with the profile information and context information and optionally any additional content based on the content recommendation from the one of the content provider server devices 16(1)-16(n) which processed the request and forward the customized content and optionally any additional content to the requesting one of the client computing devices 14(1)-14(n).

In step 114, the content management computing apparatus 12 determines whether to update the profile information of the end user at the requesting one of the client computing devices 14(1)-14(n). For example, the content management apparatus 12 might evaluate whether the last request has any new data or a change in any data in the profile information that would thus require an update of the profile information. Additionally in another example, the content management computing apparatus 12 may receive updated and/or additional data for the profile information from another source, such as from an administrator at an administrative computing device (not shown), although the updated and/or additional data for the profile information could be provided from other sources. If in step 114, the content management computing apparatus 12 determines an update to the profile information of the end user at the requesting one of the client computing devices 14(1)-14(n) is needed, then a Yes branch is taken to step 116. In step 116, the content management computing apparatus 12 updates and stores the new or modified data for the profile information of the end user at the requesting one of the client computing devices 14(1)-14(n).

If in step 114, the content management computing apparatus 12 determines an update to the profile information of the end user at the requesting one of the client computing devices 14(1)-14(n) is not needed, then a No branch is taken to step 118 where this method ends.

Accordingly, as illustrated and described with the example herein this technology provides more effective methods and devices to recommend personalized content based on profile and context information. This technology is able to identify and provide more suitable stored content in response to received requests. Additionally, this technology facilitates identifying related stored content which may not have been directly requested, but would be desirable to provide to the user. Further, this technology selects and provides stored content in a more appropriate format for different constraints relating to the requesting device, such as screen size, available bandwidth, storage capacity, and processing capability.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for recommending personalized content, the method comprising:
    identifying with a content management computing apparatus profile information for a received request associated with an end user at a requesting computing device;
    identifying with the content management computing apparatus context information associated with the requesting computing device;
    obtaining by the content management computing apparatus customized content responsive to the received request from a content provider device based on the identified profile information, the identified context information and a current network load between the content provider device and the requesting computing device, wherein the obtaining further comprises modifying by the content management computing apparatus the obtained customized content based on the identified context information and the current network load; and
    providing by the content management computing apparatus the obtained customized content to the requesting computing device.

2. The method as set forth in claim 1 further comprising:
    determining with the content management computing apparatus whether the end user at the requesting computing device associated with the received request is registered; and
    registering with the content management computing apparatus the end user at the requesting computing device associated with the receive request when the determining indicates the profile information is not stored.

3. The method as set forth in claim 1 wherein the identifying the profile information further comprises identifying with the content management computing apparatus personal information and usage pattern information associated with the end user at the requesting computing device.

4. The method as set forth in claim 3 wherein the identifying the personal information and usage pattern information further comprises:
    identifying with the content management computing apparatus personal information associated with the end user comprising at least one of age, residential address, business address, home phone number, business phone number, cell phone number, email address, occupation, primary language, religion, marital status, family status, or ethnicity of the end user; and
    identifying with the content management computing apparatus usage pattern information associated with the end user comprising information on a type and frequency of one or more prior requests by the end user.

5. The method as set forth in claim 1 wherein the identifying context information further comprises identifying with the content management computing apparatus the context information associated with the requesting computing device comprising at least one of screen size, available bandwidth, storage capacity, processing capability, location, network subscription, or network load of the requesting computing device.

6. The method as set forth in claim 1 wherein the obtaining with the content management computing apparatus further comprises:
    determining with the content management computing apparatus when one or more criteria provide by the content provider device match the profile information of the end user associated with the received request; and
    providing with the content management computing apparatus a content recommendation to the content provide device when the determining indicates the match, wherein the obtaining the customized content is further based on the content recommendation.

7. The method as set forth in claim 6 wherein the obtaining the customized content further comprises obtaining the customized content comprising responsive content to the request based at least on the identified profile information and the identified context information and additional content based on the content recommendation.

8. The method as set forth in claim 1 wherein the obtaining customized content responsive to the received request further comprises obtaining by the content management computing apparatus the customized content responsive to the received request from a content provider device further based on a current network subscription of the requesting computing device.

9. The method as set forth in claim 1 wherein the obtaining customized content responsive to the received request further comprises obtaining by the content management computing apparatus the customized content responsive to the received request from a content provider device further based on a number and type of one or more other applications executing on the requesting computing device.

10. The method as set forth in claim 1 wherein the providing the obtained customized content further comprises providing by the content management computing apparatus the obtained customized content to the requesting computing device in a response using a first communication channel which is different from a second communication channel used by the received request.

11. The method as set forth in claim 1 further comprising updating with the content management computing apparatus the profile information of the end user based on the received request.

12. A non-transitory computer readable medium having stored thereon instructions for recommending personalized content comprising machine executable code which when executed by at least one processor, causes the processor to perform steps comprising:
identifying profile information for a received request associated with an end user at a requesting computing device;
identifying context information associated with the requesting computing device;
obtaining customized content responsive to the received request from a content provider device based on the identified profile information, the identified context information and a current network load between the content provider device and the requesting computing device, wherein the obtaining further comprises modifying by the content management computing apparatus the obtained customized content based on the identified context information and the current network load; and
providing the obtained customized content to the requesting computing device.

13. The medium as set forth in claim 12 further comprising:
determining whether the end user at the requesting computing device associated with the received request is registered; and
registering the end user at the requesting computing device associated with the receive request when the determining indicates the profile information is not stored.

14. The medium as set forth in claim 12 wherein the identifying the profile information further comprises identifying personal information and usage pattern information associated with the end user at the requesting computing device.

15. The medium as set forth in claim 14 wherein the identifying the personal information and usage pattern information further comprises:
identifying personal information associated with the end user comprising at least one of age, residential address, business address, home phone number, business phone number, cell phone number, email address, occupation, primary language, religion, marital status, family status, or ethnicity of the end user; and
identifying usage pattern information associated with the end user comprising information on a type and frequency of one or more prior requests by the end user.

16. The medium as set forth in claim 12 wherein the identifying context information further comprises identifying the context information associated with the requesting computing device comprising at least one of screen size, available bandwidth, storage capacity, processing capability, location, network subscription, or network load of the requesting computing device.

17. The medium as set forth in claim 12 wherein the obtaining with the content management computing apparatus further comprises:
determining when one or more criteria provide by the content provider device match the profile information of the end user associated with the received request; and
providing a content recommendation to the content provide device when the determining indicates the match, wherein the obtaining the customized content is further based on the content recommendation.

18. The medium as set forth in claim 17 wherein the obtaining the customized content further comprises obtaining the customized content comprising responsive content to the request based at least on the identified profile information and the identified context information and additional content based on the content recommendation.

19. The medium as set forth in claim 12 wherein the obtaining customized content responsive to the received request further comprises obtaining by the content management computing apparatus the customized content responsive to the received request from a content provider device further based on a current network subscription of the requesting computing device.

20. The medium as set forth in claim 12 wherein the obtaining customized content responsive to the received request further comprises obtaining by the content management computing apparatus the customized content responsive to the received request from a content provider device further based on a number and type of one or more other applications executing on the requesting computing device.

21. The medium as set forth in claim 12 wherein the providing the obtained customized content further comprises providing by the content management computing apparatus the obtained customized content to the requesting computing device in a response using a first communication channel which is different from a second communication channel used by the received request.

22. The medium as set forth in claim 12 further comprising updating the profile information of the end user based on the received request.

23. A content management computing apparatus comprising:
one or more processors;
a memory coupled to the one or more processors which are configured to execute programmed instructions stored in the memory comprising:
identifying profile information for a received request associated with an end user at a requesting computing device;
identifying context information associated with the requesting computing device;
obtaining customized content responsive to the received request from a content provider device based on the identified profile information, the identified context information and a current network load between the content provider device and the requesting computing device, wherein the obtaining further comprises modifying by the content management computing apparatus the obtained customized content based on the identified context information and the current network load; and
providing the obtained customized content to the requesting computing device.

24. The apparatus as set forth in claim 23 wherein the one or more processors is further configured to execute programmed instructions stored in the memory further comprising:
   determining whether the end user at the requesting computing device associated with the received request is registered; and
   registering the end user at the requesting computing device associated with the receive request when the determining indicates the profile information is not stored.

25. The apparatus as set forth in claim 23 wherein the one or more processors is further configured to execute programmed instructions stored in the memory for the identifying the profile information further comprising identifying personal information and usage pattern information associated with the end user at the requesting computing device.

26. The apparatus as set forth in claim 25 wherein the one or more processors is further configured to execute programmed instructions stored in the memory for the identifying the personal information and usage pattern information further comprises:
   identifying personal information associated with the end user comprising at least one of age, residential address, business address, home phone number, business phone number, cell phone number, email address, occupation, primary language, religion, marital status, family status, or ethnicity of the end user; and
   identifying usage pattern information associated with the end user comprising information on a type and frequency of one or more prior requests by the end user.

27. The apparatus as set forth in claim 23 wherein the identifying context information further comprises identifying the context information associated with the requesting computing device comprising at least one of screen size, available bandwidth, storage capacity, processing capability, location, network subscription, or network load of the requesting computing device.

28. The apparatus as set forth in claim 23 wherein the one or more processors is further configured to execute programmed instructions stored in the memory for the obtaining further comprises:
   determining when one or more criteria provide by the content provider device match the profile information of the end user associated with the received request; and
   providing a content recommendation to the content provide device when the determining indicates the match, wherein the obtaining the customized content is further based on the content recommendation.

29. The apparatus as set forth in claim 28 wherein the one or more processors is further configured to execute programmed instructions stored in the memory for the obtaining further comprises obtaining the customized content comprising responsive content to the request based at least on the identified profile information and the identified context information and additional content based on the content recommendation.

30. The apparatus as set forth in claim 23 wherein the one or more processors is further configured to execute programmed instructions stored in the memory for the obtaining customized content responsive to the received request further comprises obtaining the customized content responsive to the received request from a content provider device further based on a current network subscription of the requesting computing device.

31. The apparatus as set forth in claim 23 wherein the one or more processors is further configured to execute programmed instructions stored in the memory for the obtaining customized content responsive to the received request further comprises obtaining the customized content responsive to the received request from a content provider device further based on a number and type of one or more other applications executing on the requesting computing device.

32. The apparatus as set forth in claim 23 wherein the one or more processors is further configured to execute programmed instructions stored in the memory for the providing the obtained customized content further comprises providing the obtained customized content to the requesting computing device in a response using a first communication channel which is different from a second communication channel used by the received request.

33. The apparatus as set forth in claim 23 wherein the one or more processors is further configured to execute programmed instructions stored in the memory further comprising updating the profile information of the end user based on the received request.

* * * * *